United States Patent [19]

Marie et al.

[11] Patent Number: 5,106,180
[45] Date of Patent: Apr. 21, 1992

[54] MULTIFOCAL OPHTHALMIC LENS

[76] Inventors: Robert Marie, 4965 Roslyn, Montreal, Canada, H2W 1Z5; Grant Gabrielian, 175 Deguire, Apt. 711, Ville St-Laurent, Canada, H4N 1P1

[21] Appl. No.: 707,902

[22] Filed: May 30, 1991

[51] Int. Cl.⁵ .............................................. G02C 7/04
[52] U.S. Cl. ................................... 351/161; 359/628
[58] Field of Search ............... 351/159, 168, 169, 170, 351/171, 172, 176, 160 H, 160 R, 161, 162; 350/452, 167; 359/626, 628, 742

[56] References Cited

U.S. PATENT DOCUMENTS

| | | | |
|---|---|---|---|
| 4,210,391 | 1/1980 | Cohen | 351/161 |
| 4,338,005 | 7/1982 | Cohen | 351/161 |
| 4,340,283 | 7/1982 | Cohen | 351/161 |
| 4,418,991 | 12/1983 | Breger | 351/161 |
| 4,463,148 | 7/1984 | Hofer et al. | 351/160 H |
| 4,525,043 | 6/1985 | Bronstein | 351/161 |
| 4,630,906 | 12/1986 | Bammert et al. | 351/159 |
| 4,704,016 | 11/1987 | de Carle | 351/161 |
| 4,765,728 | 8/1988 | Porat et al. | 351/161 |
| 4,795,462 | 1/1989 | Grendahl | 351/161 |
| 4,798,608 | 1/1989 | Grendahl | 351/161 |
| 4,890,913 | 1/1990 | De Carle | 351/161 |
| 4,950,057 | 8/1990 | Shirayanagi | 351/169 |
| 5,016,977 | 5/1991 | Baude et al. | 351/176 |

FOREIGN PATENT DOCUMENTS 1319800  1/1963  France .
WO88/09950  12/1988  PCT Int'l Appl. .

*Primary Examiner*—Scott J. Sugarman
*Attorney, Agent, or Firm*—Robic

[57] ABSTRACT

An ophthalmic lens has front and rear optical surfaces, a central optical axis substantially perpendicular to the lens and comprises a plurality of concentric, contiguous circular refractive bands provided on at least one of the front and rear optical surfaces. The bands have a continuous cross-section in the shape of a segment of an ellipse having a given major axis length and eccentricity. The bands are of alternating optical power to focus light on at least two focal planes to provide simultaneous multifocal vision. The major axis of each ellipse segment intersects the central optical axis and a respective one of the at least two focal planes. The bands are continuous at their boundaries between neighboring ones of the bands. The entire optical surface of the lens may be used with minimal distortion caused by the intersections of the continuous bands.

5 Claims, 2 Drawing Sheets

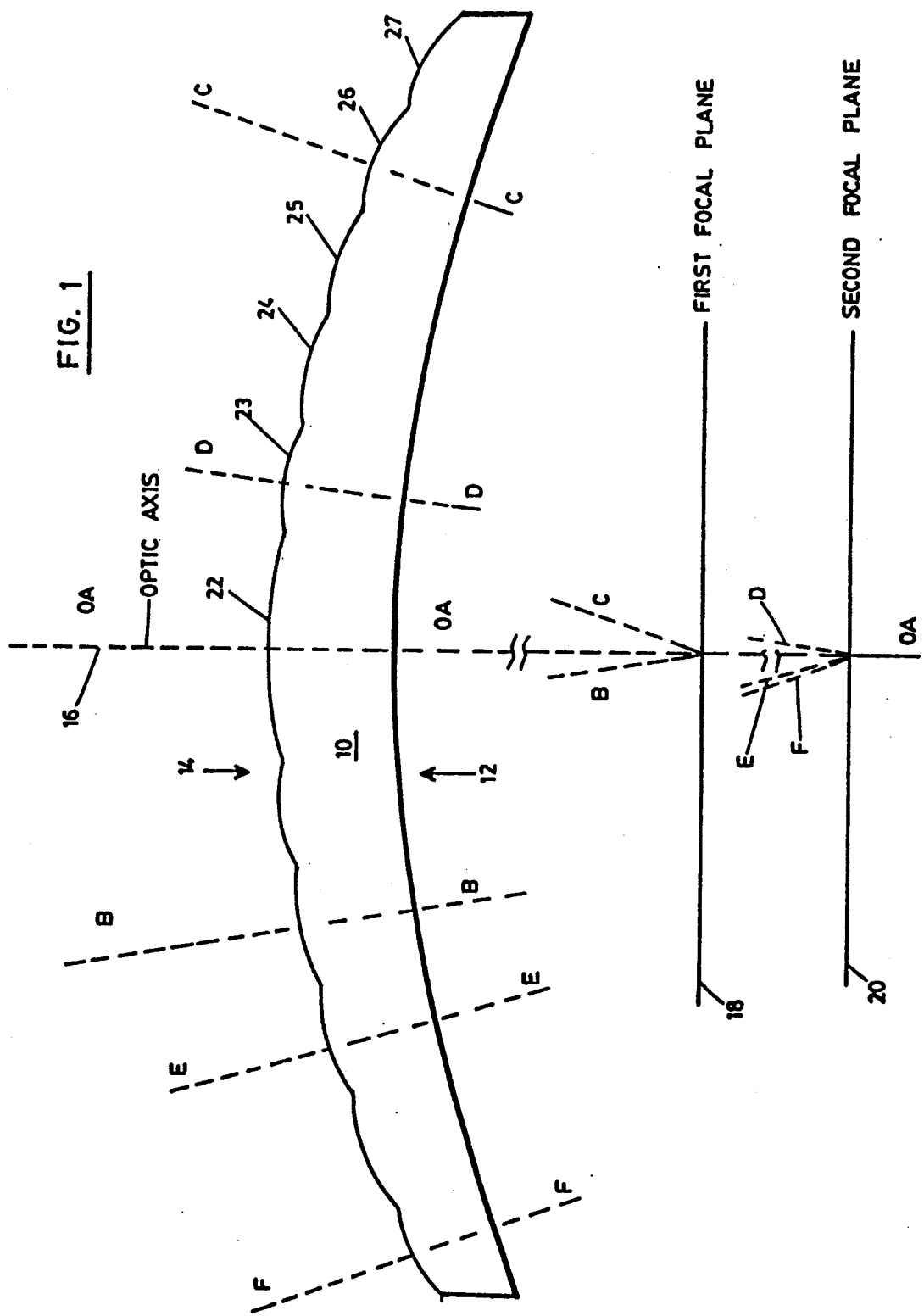

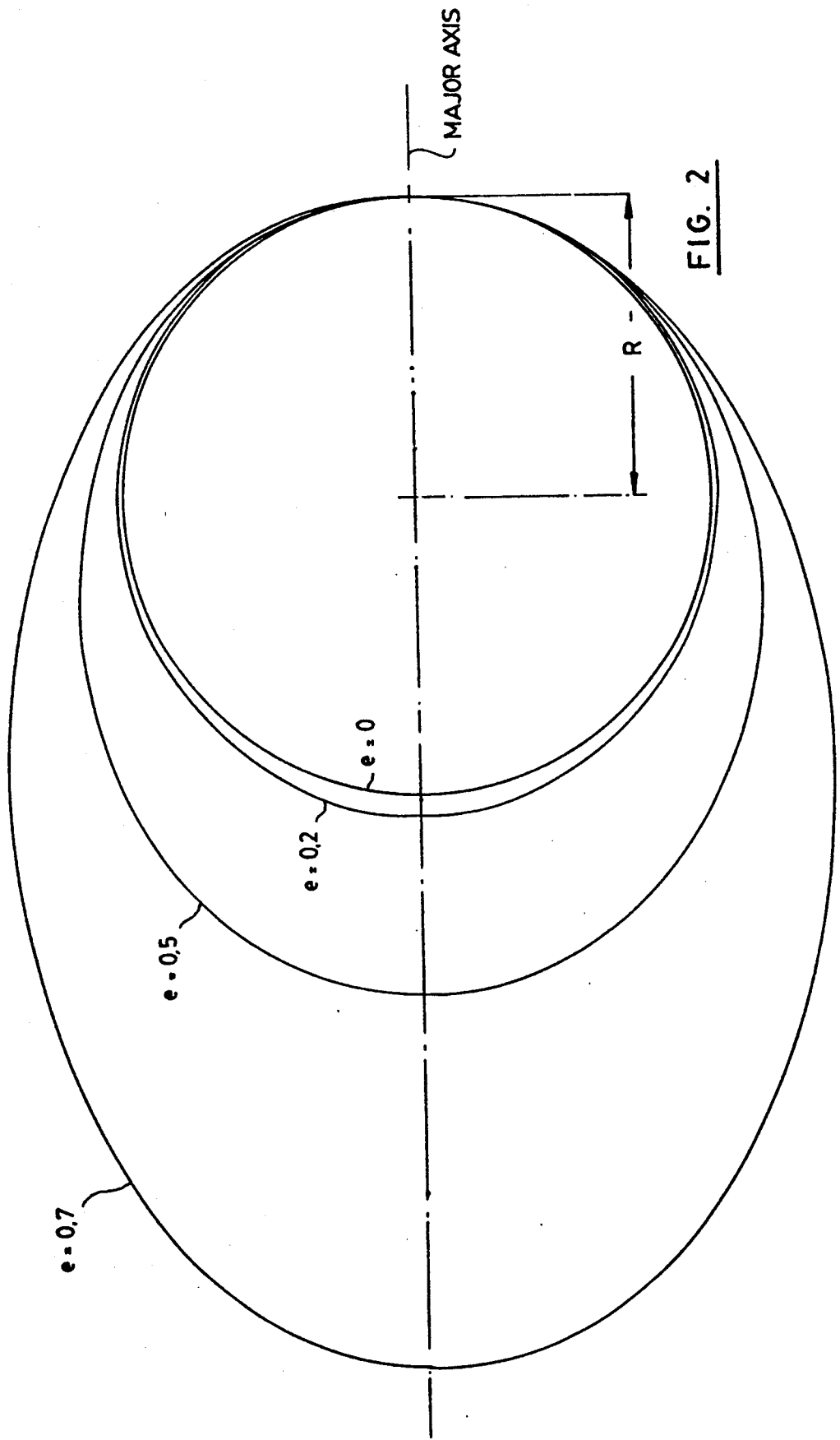

MULTIFOCAL OPHTHALMIC LENS

BACKGROUND OF THE INVENTION

1. FIELD OF THE INVENTION

The present invention relates to a refractive ophthalmic lens for simultaneous multifocal vision, the lens having at least one of its surfaces formed with a number of concentric circular bands, each of which has a prescribed dioptric power, the bands having an elliptical cross-section.

2. DESCRIPTION OF THE PRIOR ART

One form of multifocal ophthalmic lens is proposed in U.S. Pat. Nos. 4,210,391; 4,340,283 and 4,338,005 (Allen L. Cohen) whereby a multifocal Fresnel lens is constructed by means of modifying the phase separating annular rings of a zone plate, with curved or inclined optical facets of varying refractive indices which then function as Fresnel rings corresponding to the different focal powers desired. To counteract the inherent problems of a Fresnel lens with small annular zone widths where optical aberrations are introduced by diffraction effects, a zone plate is introduced. Thus, an ophthalmic lens according to the above patents would be a composite device comprised of a Fresnel lens and a zone plate.

A zone plate, essentially, is a diffraction optical device that consists of a series of concentric opaque rings of such predetermined width that rays from alternate half period elements are cut off. Such a device has some properties of a converging lens. Therefore, it has been attempted to use the combination of Fresnel lens and zone plate to approximate the function of a true refractive lens in either bifocal or multifocal configurations.

Anticipating the limitations presented by such a design, two of which are limited image brightness and limited dioptric power, another form of a multifocal ophthalmic lens has been proposed. Here the said lens is also a composite device as described above except that a phase shift multifocal zone plate is constructed in such a way that some of the zone plate focii actually coincide with some of the multifocal Fresnel lens focii. This is obviously done to increase image brightness at each of the focii. An ophthalmic lens designed on this basis will present two major drawbacks, both of which cannot be circumvented due to the inherent optical properties of such a device.

The first drawback is the fundamental problem of inadequate image brightness typical to such designs, especially considering the wide range of focal points in such a lens. The other drawback is the limited range of focal lengths achievable with such a device.

Specifically, if a bifocal lens of a certain power is constructed, a very limited additional power for near vision can be provided. Whenever an appreciable additional power is required, the said lens would be of very little value. The physical properties of light, such as wavelength and relative intensity, will fundamentally limit the performance of any multifocal ophthalmic lens, such as those proposed in U.S. Pat. Nos. 4,210,391; 4,340,283 and 4,338,005 mentioned earlier, especially when a small size is an absolute necessity, as is the case with contact or intraocular lenses.

It is paramount to keep in mind that any diffractive or composite diffractive lenses or devices are principally different from refractive lenses and only approximate a true refractive system.

Another type of an ophthalmic lens has been proposed in U.S. Pat. No. 4,418,991 (Joseph L. Breger). More specifically, a contact lens that would provide a distance correction at the center, while increasing the diopter adds away from the center would provide for intermediate and close viewing. (See Col. 5 lines 1 through 21 of Breger).

The dioptric power change in the above lens is achieved by progressively changing the radius of curvature of the posterior surface. A major limitation of such a lens is that the focal planes provided are not discrete but a progressive succession of innumerable possibilities, and therefore no truly sharp focal planes may be provided.

Another drawback is that the images produced will be located on substantially different areas of the retina which as is commonly known do not have the same sensitivity. Still another factor limiting the performance of such a lens will be its absolute dependence on the position relative to the pupil and the pupil size as well as its dilation. It is a common knowledge that to achieve a continuously ideal position with a contact lens is not frequently possible. To control the pupil size or dilation relative to changing luminosity is even more difficult. It is important to note that lenses of progressive power change designs share common drawbacks and limitations regardless of whether the distance vision is in the center or toward the edges of the viewing area. Obviously the limiting factors are not equivalent but their presence severely curtails the performance of such or similar lenses in one way or another.

Still another design of a multifocal ophthalmic lens is proposed in French Patent No. 1,319,800 by Sohnges. The lens in question would have discrete dioptric powers provided by concentric circular zones. The preferred version has the distance vision portion in the center of the lens and increasing dioptric power toward the periphery will provide intermediate and near vision. Although the formed images will be clearer than in progressive power increase or decrease designs, the performance of the lens in question will be limited due to a critical dependence on pupil size, centration of the lens relative to the pupil, ambient illumination as well as due to the creation of images on substantially different areas of the retina. Essentially the drawbacks of this design are similar to the ones in the progressive power change lenses differing mainly in the fact that the powers provided are discrete and not continuous.

Another form of an ophthalmic lens is described in WO88/09950 (Valdemar Portney). The proposed lens has a plurality of concentric alternating zones with a continuously varying power within each zone as well as in transition from one zone to another. In one version, continuous alternating power is accomplished by a continuously changing curvature of the posterior surface of the lens. In another version continuous, alternating power variation is accomplished by creating non-homogeneous surface characteristics having refractive material indices which continuously vary in the lens radial direction. In other words, the optical portion of such a lens is comprised of a number of concentric zones. The distinctive characteristic of this design (page 9, lines 2 through 5) is that each zone is considered to include a complete cycle of powers from intermediate to high to intermediate to low, then back to intermediate.

Still another type of a multifocal ophthalmic lens is described in U.S. Pat. No. 4,798,608 (Dennis T. Grendahl). The invention pertains to an implantable intraocular lens containing a laminated structure comprising a number of laminated planar or curved elements. The incident rays are brought to a focus on a portion of the retina and are dependent on the number of lens elements traversed by a ray. Areas of differing powers are provided by forming a uniform lens surface over a composite laminated structure of laminate elements having different indices of refraction. Although the field of the invention claims to encompass contact lenses, producing a contact lens according to this invention would be highly impractical, given the physical structure of a contact lens. A typical thickness of an average rigid contact lens is about 0.12 mm across the cross section. Assuming only a three layer laminate structure according to the invention, to provide near, intermediate and distant vision, the curvatures in question relative to indices of refraction to provide dioptric requirements of a typical contact lens will render the center thickness of such a lens in the range of 1.00 to 1.30 mm which is not practical.

A related invention is described in U.S. Pat. No. 4,795,462 (Dennis T. Grendahl). It pertains mostly to intraocular lenses but also covers contact and intracorneal lenses. A lens according to Grendahl contains annular elements each of which serves to bring the impinging rays from an object at a predetermined distance to a focus on a particular region of the retina. The lens is a composite of a cylindrical and annular optical lens elements each of which has a distinct power and focal length (see Col. 1, line 65 thereof). It differs from many other annular designs by the fact that it has a cylindrically segmented composite zone of focus.

A different multifocal lens design is proposed in U.S. Pat. No. 4,704,016 (John T. deCarle). A contact lens is described wherein the major viewing area is divided into a number of near and distant vision zones. Of relevance to the present discussion is the case of a lens (see Col. 2, line 13), the front or the back surface of which is formed with a series of concentric areas, each annular area being cut alternately for distant and near vision. A lens produced according to that invention (see Col. 2, line 67 through Col. 3, line 16) will, as it is readily understood, have sharp steps at the lines of transition between annular areas. The magnitude of these steps for a typical contact lens would be in the order of 140 microns or 0.014 mm. This in itself will produce aberrations in the form of a multitude of prisms as well as diffractive effects. These combined (or even separately) will render the design disadvantageous. Therefore, a way of circumventing sharp steps is proposed (see Col. 3, line 4 through 16), whereby the center of curvature continually changes position relative to the central axis (which happens to be the optical axis as well) when moving the cutting tool to produce a profile which would have no sharp steps. In this case, annular rings of the like power will have the same curvature but different centers both geometrically and optically. This means that each of these centers is located on a different optical axis. None of this multitude of optical axes coincide with the central principal optical axis of the lens (and the eye) except for the central zone axis and the zone immediately adjacent to it. Needless to say that a lens having a multitude of optical axes, once placed on an eye which has only one visual axis, will present a series of blurred images. This is of little value in view of the vision correction requirements.

A continuation of the above patent is U.S. Pat. No. 4,890,913. Here, as in the preceding case, a contact lens is formed, the viewing area of which is comprised of a plurality of annular viewing zones, each near vision zone being adjacent to a distant vision zone. The drawbacks of this lens will be exactly the same as in the preceding case, since it is essentially the same type of contact lens.

In retrospect, all of the relevant prior art examples have the common characteristic of circular (annular) concentric elements formed in the viewing area of the lens. All of them have drawbacks when considered in contact lens configuration.

SUMMARY OF THE INVENTION

An object of the present invention is to provide a refraction ophthalmic lens which is constructed in such a way that its position relative to the pupil is immaterial insofar as the dioptric power range and distribution is concerned.

Another object of the invention is to provide a refraction ophthalmic lens offering the full range of prescribed visual correction from anywhere on the viewing portion of the lens and permitting the ideal lens/cornea relationship to be respected.

A further object of this invention is to provide a refraction ophthalmic lens, wherein any area of significant size and/or location across the viewing portion of the lens is able to provide a complete range of prescribed dioptric powers.

Still another object of the invention is to provide a contact lens having concentric bands alternating in dioptric powers, which are sufficiently narrow to provide that, when viewed through an area of the smallest practical angular size, a significant number of dioptrically different bands is present, thereby insuring the availability of dioptric powers for near, intermediate and distant vision. Of importance is the fact that such a small area of vision may be anywhere in the viewing area of the contact lens, i.e. the optical zone of the contact lens.

A principal and paramount object of the invention is to provide a contact lens having concentric bands alternating in dioptric power where the bands are described by elliptical curves, each of which is a segment of an ellipse of revolution, that is a solid generated by rotating an ellipse about the optical axis of the lens. The inclination of the major and minor axis of the ellipse relative to the optical axis of the lens, their positions relative to the said optical axis and their individual eccentricities are to be calculated in a manner suitable to the context of the invention.

A further object of the invention is to provide a contact lens having concentric bands, the junctions of which are smooth and devoid of any sharp transitions or steps. More specifically, each transition will be a single point common to a pair of elliptical curves. The point in revolution of course becomes a single line of no practical width on the surface of the lens.

According to the invention, there is provided an ophthalmic lens having front and rear optical surfaces and a central optical axis substantially perpendicular to the lens, the lens comprising:

a plurality of concentric, contiguous circular refractive bands provided on at least one of the front and rear optical surfaces, the bands each having a continuous cross-section in the shape of a segment of an ellipse having a given major axis length and eccentricity, the bands being of alternating optical power to focus light on at least two focal planes to provide simultaneous multifocal vision, the major axis of each segment of an ellipse intersecting the central optical axis and a respective one of at least two focal planes, the bands being continuous at their boundaries between neighboring ones of the bands.

BRIEF DESCRIPTION OF THE DRAWINGS

The invention will now be better understood by way of the following description of a preferred embodiment with reference to the appended drawings in which:

FIG. 1 shows a cross-section of a contact lens illustrating the preferred embodiment, and FIG. 2 shows some members of a family of ellipses having the same radius of curvature at their vertex.

DETAILED DESCRIPTION OF THE PREFERRED EMBODIMENT

FIG. 1 shows the cross-section of a contact lens made according to the preferred embodiment of the invention, which is shown not to scale and with exaggerated formations in order to illustrate the invention. Lens (10) is made of conventional contact lens material, and may be molded into its general shape and precision machine lathed on its front surface to provide the exact shape as required in accordance with the invention. Rear surface (12) of the lens is a continuous surface which may be shaped spherically or spheroidal in order to conform to the user's cornea (see U.S. Pat. No. 4,765,728 for a description of a spheroidally shaped rear contact lens surface).

Front surface (14) is provided with a number of concentric circular bands having different dioptric powers. A first series of bands is generated by revolving elliptical profiles about axis (16) to form an elliptical band. The first series of bands (22), (24) and (26) are ellipses of revolution having parameters which are chosen to form an image on the first focal plane (18) with the constraint that the point or points where the elliptical bands (22), (24) and (26) end and join the second series of elliptical bands (23), (25) and (27) match perfectly. Elliptical band (22) is an ellipse of revolution about optical axis (16) and does not form a ring-like band but rather forms the central portion of the lens (10). The second series of elliptical bands (23), (25) and (27) are ellipses of revolution having different parameters chosen to yield a different dioptric power.

The elliptical bands (22), (24) and (26) are formed by ellipses having their major axes OA, B and C intersect the optic axis (16) at the first focal plane (18) and have parameters which are chosen so that the boundaries of the elliptical bands (22), (24) and (26) are continuous with the boundaries of bands (23), (25) and (27) and also so that the optical focal point of the bands (22), (24) and (26) is on a optic axis (16) at focal plane (18).

Similarly, the second series of bands (23), (25) and (27) have major axes D, E and F, which intersect the second focal plane (20) at the optic axis (16).

The first series of elliptical bands (22), (24) and (26) will focus light to an image formed on the first focal plane (18) and the second series of elliptical bands (23), (25) and (27) will focus light to form an image on the second focal plane (20).

It is to be understood that the lens shown in FIG. 1 is of an exaggerated shape in order to illustrate the invention, and that actual curvatures are to be determined according to lens specifications as described below.

The dioptric power D of a lens surface is given by:

$$D = \frac{n' - n}{R}$$

where n' is the refractive index of the lens material, n is the refractive index of air, and R is the radius of curvature of the surface.

In the case of an ellipse of revolution, the radius of curvature R is given by:

$$R = f(1+e)$$

where f is the distance between the major axis vertex and the focus (the closer geometric focal point), and e is the eccentricity of the ellipse.

The dioptric power of a lens is given by the difference between the dioptric powers of its outer and inner surfaces.

The design parameters of an ophthalmic lens according to the invention are: the number of series of bands (two series is for a bifocal lens, three series is for a trifocal lens, etc.); the width of the bands; the position of the bands (on front surface (14) or rear surface (12), or both), the dioptric power of the series of bands, and the index of refraction of the lens material. In the specification, the elliptical cross-section bands could also have an eccentricity equal to zero, thus including within the definition of an ellipse, the circle as an ellipse of eccentricity equal to zero.

In the preferred embodiment shown in FIG. 1, rear surface (12) has a circular cross-section. Of course, the difference between the respective dioptric power of the series of circular bands on surface (14) and of surface (12) defines the dioptric power of the respective series of circular bands of the lens (10).

Essentially, once the above-mentioned parameters of the number of series of bands, the width of the bands, the dioptric power of the series of bands, and the index of refraction of the lens material are chosen, the remaining parameter to be determined is the focal length and eccentricity of the ellipse which is to be fit between adjacent bands such that the elliptical cross-sections of the bands are joined at intersection points so that a continuous surface (14) of the lens is obtained. In the preferred embodiment, the dioptric power of surface (12) is constant, and therefore, the two series of bands each have their own predetermined dioptric power. Although there are an infinite number of ellipses of revolution having a given dioptric power, the member of the family of ellipses having the appropriate dioptric power which has the smallest eccentricity while still fitting between adjacent bands on the lens is chosen.

FIG. 2 shows four exemplary members of a family of ellipses having the same radius of curvature, R at their vertex. The eccentricities shown are 0 (circle of radius R), 0.2, 0.5 and 0.7.

Thus, the elliptical curves of the series of bands may be chosen by choosing the intersection points of the cross-section of the bands, along with the required dioptric powers for the series of bands, and then fitting an ellipse having its major axis extending from the optical axis at the focal plane to the lens at an angle such that a portion of the ellipse near the vertex extends between the two intersection points of the adjacent bands. If the ellipse does not fit between the two points, another member of the family of ellipses having the same dioptric power is chosen, which has an eccentricity which is greater until it is possible to fit an ellipse which joins the two intersection points, while varying the inclination of the major axis with respect to the optical axis. Of course, the determination of a suitable eccentricity and angle of inclination of the elliptical cross-section forming a given band can also be achieved mathematically instead of by geometrical construction.

The viewing portion of such a lens produced according to the present invention, i.e. the optical zone, is a centrally located circular area which is of sufficient size to cover the pupil in dilated state, taking into account the lens movement due to blink cycle as well as due to lateral and vertical eye movement. The actual size of the optical zone will be within practical limits well known to those skilled in the art. The optical zone may be surrounded by one or several peripheral zones having the usual lens fitting functions.

It is pointed out that a contact lens constructed according to the present invention may be a bifocal or a multifocal. The width of the bands may be selected according to the clinical requirements and in practical terms, several of the bands must cover the pupil at any one time. The bands are of different dioptric power chosen for near and distant vision. They alternate successively so that at any one time the pupil is covered by several bands representing either near and distant vision in a bifocal lens case or near, intermediate and distant vision in a multifocal lens case.

It is well known that the image processing capacity of the brain allows for a situation where it is presented with a series of different focal plane images. The images of interest are selected and concentrated upon whereas the rest of the images are largely ignored.

Manufacturing a contact lens according to the present invention presents no problems considering the advent of sophisticated computer controlled lathes capable of describing almost any solid of revolution. They also possess the required precision and accuracy. Thus, a lens may be lathe cut. It is also possible to manufacture molds or dies and either mold or cast such a lens. Conversely, a combination of methods may be employed, where a base curve is cast and the front surface is lathe cut or the reverse may be the case. In other words, there are many possibilities for manufacturing such a lens.

What is claimed is:

1. An ophthalmic lens having front and rear optical surfaces and a central optical axis substantially perpendicular to the lens, the lens comprising:
a plurality of concentric, contiguous circular refractive bands provided on at least one of said front and rear optical surfaces, the bands each having a continuous cross-section in the shape of a segment of an ellipse having a given major axis length and eccentricity, the bands being of alternating optical power to focus light on at least two focal planes to provide simultaneous multifocal vision, the major axis of each said segment of an ellipse intersecting the central optical axis and a respective one of said at least two focal planes, said bands being continuous at their boundaries between neighboring ones of said bands.

2. The lens according to claim 1, wherein the eccentricity of one of said bands is zero, whereby said one of said bands has a circular cross-section.

3. The lens according to claim 1, wherein said bands are provided on said front optical surface, and wherein said rear optical surface is spheroid.

4. The lens according to claim 3, wherein the eccentricity of the spheroid rear optical surface is zero, whereby said rear optical surface is spherical.

5. The lens according to claim 1, wherein said bands focus light on two focal planes to provide simultaneous bifocal vision.

* * * * *